United States Patent [19]
Akita et al.

[11] Patent Number: 5,490,730
[45] Date of Patent: Feb. 13, 1996

[54] SLIDE BEARING ASSEMBLY

[75] Inventors: Hideki Akita, Tsuchiura; Makoto Ota, Ibaraki; Hideaki Nakatani, Tsuchiura; Kazuyoshi Hatano; Manabu Ogasawara, both of Ibaraki, all of Japan

[73] Assignee: Hitachi Construction Machinery Co., Ltd., Tokyo, Japan

[21] Appl. No.: 326,334

[22] Filed: Oct. 20, 1994

[30] Foreign Application Priority Data

Oct. 22, 1993 [JP] Japan .................................. 5-287527
Aug. 11, 1994 [JP] Japan .................................. 6-210493
Sep. 27, 1994 [JP] Japan .................................. 6-256095

[51] Int. Cl.$^6$ ............................................. F16C 33/10
[52] U.S. Cl. .................... 384/147; 384/279; 384/902
[58] Field of Search ........................ 384/147, 902, 384/279, 371, 470; 252/32.7 E

[56] References Cited

U.S. PATENT DOCUMENTS

| | | | |
|---|---|---|---|
| 4,371,220 | 2/1983 | Brucher | 384/371 |
| 4,952,328 | 8/1990 | Davis et al. | 252/32.7 E |
| 4,981,602 | 1/1991 | Ripple et al. | 252/32.7 E |
| 5,401,105 | 3/1995 | Suzuki et al. | 384/470 |

OTHER PUBLICATIONS

"Iwanami's Dictionary of Physicochemistry", 4th Edition, p. 1276. (no date).

*Primary Examiner*—Lenard A. Footland
*Attorney, Agent, or Firm*—Fay, Sharpe, Beall, Fagan, Minnich & McKee

[57] ABSTRACT

The improved slide bearing assembly comprises at least a shaft and a bush that is formed of a porous iron-base sintered material and is characterized in that the bush is impregnated with a lubricant oil having a viscosity of 240–1500 cSt. The bearing assembly can be operated in slow- and high-pressure applications without oil refillings for a prolonged period of at least several years. The shaft is preferably formed of an iron or a steel member that have been subjected to a treatment of surface modification. The slide bearing assembly is preferably used in such an environment that the working pressure applied to the sliding surfaces is at least 6.0 kgf/mm$^2$ and that the sliding speed is in the range 2–5 cm/sec.

22 Claims, 9 Drawing Sheets

DUST SEAL AREA    CONTACT AREA    RF QUENCHED AREA

5 μm

SHAFT

BUSH

SLIDE BEARING ASSEMBLY

BACKGROUND OF THE INVENTION

This invention relates to a slide bearing assembly and, more particularly, to a slide bearing assembly that can be operated in slow- and high-pressure applications without oil refillings for a prolonged period.

To operate the drive mechanism of excavators such as construction machines, the respective parts of the mechanism are coupled together in a rotatable or swingable manner so that they can be driven with a cylinder and other actuators. Take, for example, a hydraulic shovel having a bucket coupled to the arm at the distal end. To perform excavation with the bucket, the bucket cylinder is reciprocated so that the bucket rotates or swings about the point where it is coupled to the arm. To this end, the bucket is coupled to the arm by means of a slide bearing assembly comprising a shaft and a bush.

Figure 14:
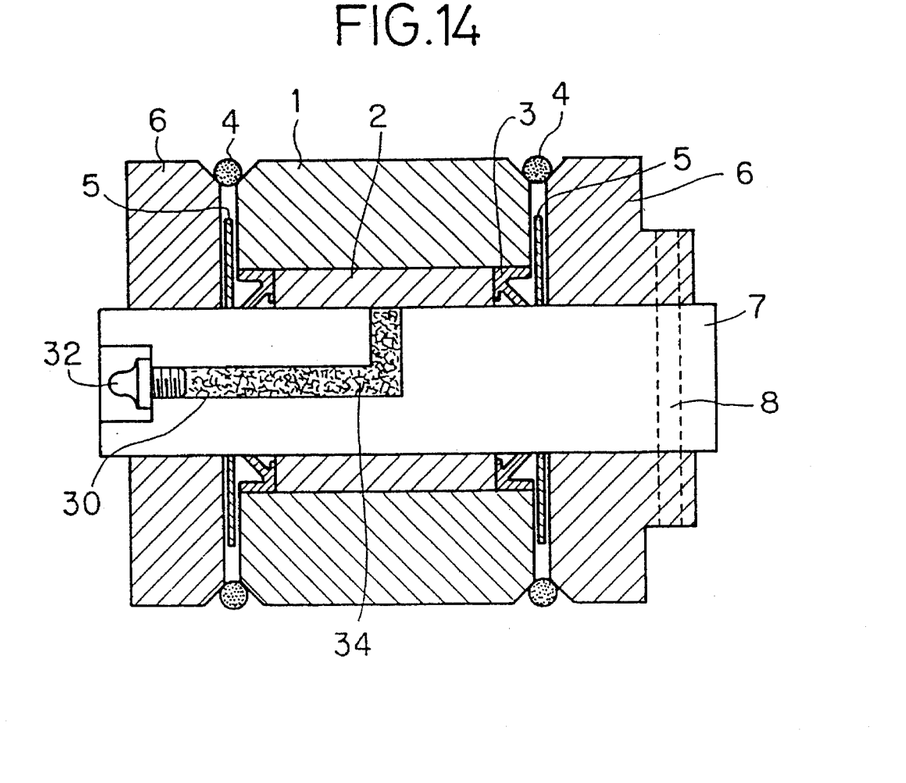
FIG. 14 is a cross-sectional view showing a prior art grease-fed slide bearing assembly.

FIG. 14 is a cross-sectional view of a prior art slide bearing assembly. As shown, a boss 1 has a bush 2 fitted therein. A dust seal 3 is pressed against both ends of the bush 2. A bracket 6 is provided at both ends of the boss 1 and a shim 5 is inserted in the gap between the boss 1 and each bracket 6. An O-ring 4 is fitted around each of the gaps. A shaft 7 is inserted through the bracket 6 at one end, the bush 2 and the bracket 6 at the other end. The shaft 7 is prevented from rotating by means of an engagement bolt 8 passing through the shaft 7 and the bracket 6 at one end. A grease feed hole 30 is formed that runs from the other end of the shaft 7 to the middle of the bush 2. A stopper 32 is threaded into one end of the feed hole 30, which is filled with grease 34.

During excavation, a slow but extremely large pressure is applied to the surfaces of the slide bearing assembly. Under the circumstances, the sliding surfaces must be amply supplied with a thick lubricant such as grease in order to prevent the occurrence of sticking, galling, uneven wear and other troubles in early periods. To this end, frequent grease refillings are necessary but the refilling operation is not always easy to perform.

Another problem with grease refilling is that the old grease which has turned liquid must be discharged out of the bearing before it is refilled with new grease. Such discharge and refilling operations are usually performed at excavation sites. The discharged liquid grease is disposed of by being scattered over the surface of the soil at the site but this can cause a pollution problem. With the recent concern over environmental protection, it is particularly desired to refrain from discarding or scattering the liquid grease over the soil surface during the preparation of housing sites and gardening operations in urban areas.

Figure 15:
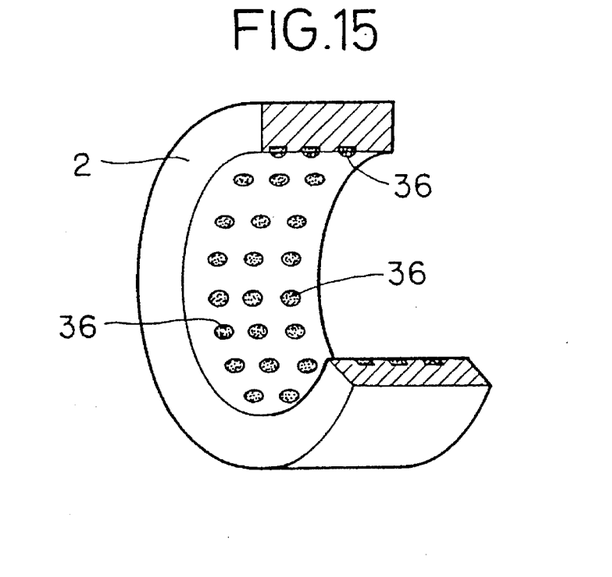
FIG. 15 is a perspective view showing schematically, with part taken away and partially in section, a prior art bush having the particles of a solid lubricant embedded in its inner surface.

With a view to maintaining lubricity on the sliding surfaces for a prolonged period without refilling grease and other lubricants, various methods have been developed, as exemplified by embedding a solid lubricant in the sliding surface of a bush (see FIG. 15, in which the bush 2 has graphite particles 36 embedded in the sliding surface). Other methods include forming the bush of self-lubricating plastics or using unconventional means such as a magnetic bearing and a pneumatic bearing. However, magnetic and pneumatic bearings are not suitable for use in high-load applications. Bearings that use solid lubricants (e.g. graphite) or self-lubricating materials (e.g. plastics) also have their own limitations. In the former case, the touch between base metal parts makes the occurrence of microscopic "galling" unavoidable. In the latter case, the insufficient strength and hardness of self-lubricating materials may occasionally result in a sudden occurrence of abnormal wear or deformation (creep).

SUMMARY OF THE INVENTION

An object, therefore, of the present invention is to provide a slide bearing assembly that can be operated in slow- and high-pressure applications without oil refillings for a prolonged period of at least several years.

This object of the invention can be attained by a slide bearing assembly comprising at least a shaft and a bush that is formed of a porous iron-base sintered material, characterized in that the bush is impregnated with a lubricant oil having a viscosity in the range from 240 to 1500 cSt.

The shaft is preferably formed of an iron or a steel member that have been subjected to a treatment of surface modification.

The slide bearing assembly of the invention is preferably used in such an environment that the working pressure applied to the sliding surfaces is at least 6.0 kgf/mm$^2$ and that the sliding speed is in the range from 2 to 5 cm/sec.

The slide bearing assembly of the invention has a high-viscosity lubricant oil impregnated in a porous bush and, hence, can be operated continuously for a prolonged period, say, for at least 5 years without oil refillings even in a slow- and high-pressure working environment.

THE PREFERRED EMBODIMENTS OF THE INVENTION

The slide bearing assembly of the invention is described below specifically with particular reference to drawings.

Figure 1:
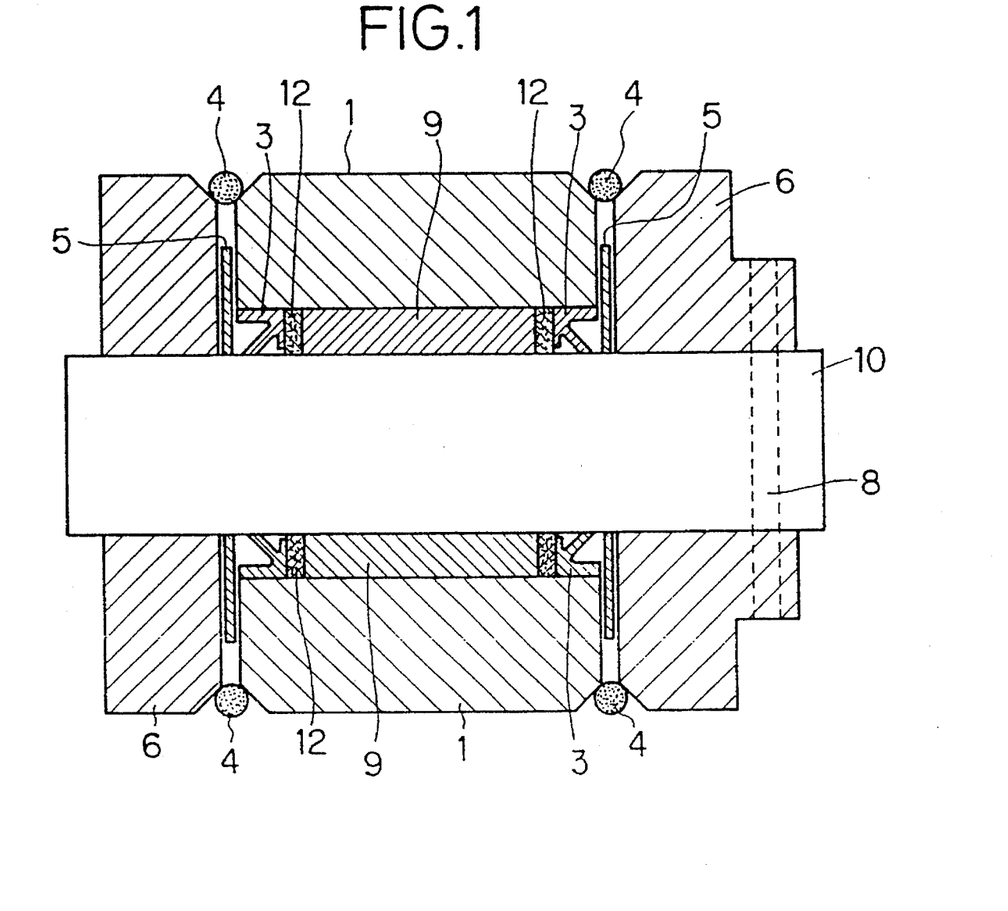
FIG. 1 is a cross-sectional view showing schematically an example of the slide bearing assembly of the invention.

FIG. 1 shows in cross section an example of the slide bearing assembly of the invention. It has basically the same construction as the prior art version illustrated in FIG. 14 and, hence, the following description uses the same reference numerals to explain the same parts or members as those shown in FIG. 14. The slide bearing assembly shown in FIG. 1 also has a bush 9 fitted in the boss 1. A bracket 6 is provided at both ends of the boss 1 and a shim 5 is inserted in the gap between the boss 1 and each bracket 6. An O-ring 4 is fitted around each of the gaps. A shaft 10 is inserted through the bracket 6 at one end, the bush 2 and the bracket 6 at the other end. The shaft 10 is prevented from rotating by means of an engagement bolt 8 passing through the shaft 10 and the bracket 6 at one end.

The bush 9 in the slide bearing assembly of the invention is made of a porous composite sintered alloy that is typically formed from a copper and an iron powder. Porous bushes made of other materials may also be used. The bush has preferably a porosity of about 5–30%. If the porosity is less than 5%, the impregnation of the bush with the high-viscosity lubricant oil is so small that there is the likelihood that it cannot be used as a component of a bearing assembly that needs no oil refillings. If the porosity is higher than 30%, the mechanical strength of the bush becomes too small to prevent its breakage during service. The pores in the bush preferably communicate with one another.

In accordance with the invention, the porous bush described above is impregnated with a high-viscosity lubricant oil having a viscosity in the range from 240 to 1500 cSt. Below 240 cSt, the fluidity of the lubricant oil is so high that it becomes difficult to retain the oil within the pores in the bush and unwanted troubles such as "galling" may occur during service, thus rendering it impossible to use the bearing assembly for a prolonged period without oil refillings. Beyond 1500 cSt, the lubricant oil exuding over the sliding surfaces due to frictional heat will not readily return to the porous interior and the desired sliding characteristic cannot be maintained consistently over a prolonged period.

The lubricant oil to be impregnated in the porous bush is not limited to a particular formulation insofar as its viscosity is within the range specified above. Mineral oils, synthetic oils and all other commercial lube oil formulations can be used in the invention. It should, however, be noted that grease is not suitable for impregnation in the bush since it contains fibers. The lubricant oil to be used in the invention may contain the fine particles ($\leq 500$ μm) of solid lubricants such as $MoS_2$, $WS_2$, hexagonal BN, and graphite. These fine particulate solid lubricants are particularly effective in the case where the slide bearing assembly of the invention is used in cold climates.

When impregnating the porous bush with the high-viscosity lubricant oil, the latter may be heated to make it less viscous and the bush is immersed in the resulting liquefied oil and left to stand in a vacuum atmosphere. As a result, air is sucked out of the pores in the bush, which in turn are filled with the liquid oil. If the bush thusly impregnated is recovered into the air atmosphere and left to cool to room temperature, the liquid oil in the pores in the bush loses fluidity and returns to the initial highly viscous state. Thus, the high-viscosity lubricant oil can be retained within the pores in the bush. The temperature at which the high-viscosity lubricant oil is to be heated is not limited to any particular value and is variable with the specific viscosity of the lubricant oil. Hence, the lubricant oil may be heated until it turns liquid. This is an easy work to carry out for a person skilled in the art. The time for which the bush is immersed in the liquefied lubricant oil and the degree of vacuum in which it is to be placed are not particularly limited, either, since they also depend on the viscosity of the lubricant oil to be used. What is important is that the bush should be immersed in the liquefied lubricant until the pores in the bush are saturated with the oil. Consider, for examples, the case where a lubricant oil having a viscosity of 460 cSt is heated to 60°–80° C. and the bush is immersed in the heated oil at a reduced pressure of $2 \times 10^{-2}$ mm Hg; the pores in the bush will be saturated with the lubricant oil in about one hour.

The shaft 10 is made of an iron or steel material. The iron or steel shaft 10 is preferably carburized, nitrided and rf quenched, followed by modification of its outer surface by suitable methods including the formation of a conversion coating of zinc phosphate, manganese phosphate or the like, and sulfurizing. Although the exact reason is not clear, the thus modified surface of the shaft is improved in "wetting" with the high-viscosity lubricant oil impregnated in the bush and this results in corresponding improvements in the lubricating effect of the lubricant oil and tribologial characteristics of the bearing assembly. The sliding surface of the bush 9 is also preferably modified by suitable methods including carburization, nitriding and sulfurizing. For example, a carburization hardened layer formed in a thickness of 1–3 mm, preferably about 2 mm, on the sliding surface of the bush 9 will contribute to a higher wear resistance of the bush.

The boss 1 can be tightly fitted over the bush 9 by any of the methods such as shrink fit that are well known to a skilled person in the art.

Figure 2:
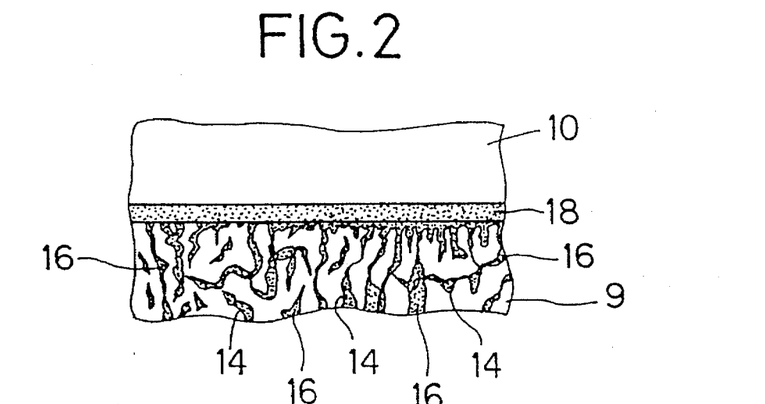
FIG. 2 is a cross-sectional view showing enlarged a part of the sliding interface between the shaft and the bush in the slide bearing assembly shown in FIG. 1.

FIG. 2 is a cross-sectional view showing schematically enlarged a part of the interface between the bush 9 and the shaft 10. As shown, the high-viscosity lubricant oil impregnated in the pores 14 in the porous bush 9 will exude over the inner periphery of the bush 9 to form a thin oil film 18, which provides a sliding interface between the bush 9 and the shaft 10 and exhibits a sufficient lubricating effect to assure desired tribological characteristics. The high-viscosity lubricant oil impregnated in the pores in the bush has such a slow degree of flowability that it will not escape from the bush even if the latter repeats sliding movements relative to the shaft. As a result, the lubricant oil film 18 will be kept supplied consistently over an extremely long period. Thus, the slide bearing assembly of the invention can be positively operated for an extended period of time without any refilling of the lubricant oil. In the prior art, "galling" occurs between the shaft 10 and the bush 9 which are driven to slide against each other under a low but high load and this is caused by the microscopic metal touch between the two members. However, in the present invention in which the bush 9 is impregnated with the lubricant oil having a viscosity between 240 and 1500 cSt, the microscopic "oil reservoir (oil film 18)" contributes to the total absence of damage due to galling and other troubles.

Turning back to FIG. 1, the amount of the high-viscosity lubricant oil impregnated in the bush 9 will occasionally exceed the supply that is necessary and sufficient to form the oil film 18 (see FIG. 2) and the excess amount may exude over the sliding interface between the shaft 10 and the bush 9. The primary reason for this exudation would be that the frictional heat from the sliding of the shaft 10 against the bush 9 causes the lubricant oil to expand with a certain drop in viscosity. If the exuding liquefied lubricant oil leaks out of the bearing assembly, not only the tribologial characteristics as observed between the shaft 10 and the bush 9 will deteriorate but also an undesired environmental pollution will occur as in the conventional case of using grease. To prevent this problem, the slide bearing assembly of the invention has an oil shield 12 provided at both ends of the bush 9 and dust seals 3 are pressed between the shaft 10 and the boss 1 in such a way that they urge the oil shields 12 against the ends of the bush 9. Thee oil shields 12 are preferably formed of a soft, elastic and oil-absorbing material. Exemplary materials that have these properties include nonwoven fabrics, woven fabrics, porous elastic plastics, sponge, asbestos and felts. Felts are preferred from the viewpoints of cost, durability and oil absorption. The liquefied lubricant oil exuding out of the bush 9 and moving in the longitudinal direction will contact the felt-made oil shield 12 at either end of the bush 9 and is absorbed by the felt, thereby insuring that the liquefied lubricant oil is effectively prevented from leaking out of the bearing assembly.

Figure 3:
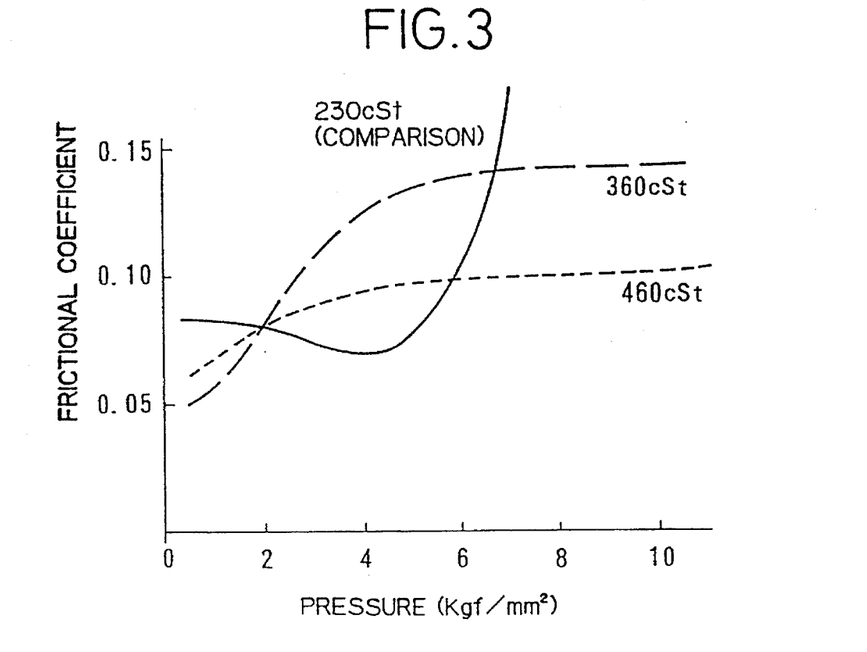
FIG. 3 is a graph showing characteristic curves for the relationship between pressure and frictional coefficient, taking as a parameter the viscosity of the lubricant oil to be impregnated in the bush of the slide bearing assembly of the invention.

FIG. 3 is a characteristic diagram showing the relationship between pressure and frictional coefficient, with the viscosity of lubricant oil in the bush being taken as a parameter. To construct this diagram, three carburized and quenched bushes were fabricated of a porous (15%) composite sintered alloy from a copper and an iron powder and then impregnated with lubricant oils having different viscosities, 230 cSt (IDEMITSU DAPHNE SUPER GEAR 230 commercially available from Idemitsu Petro-Chemical Co., Ltd.), 360 cSt (IDEMITSU DAPHNE SUPER GEAR 360 of Idemitsu Petro-chemical Co., Ltd.) and 460 cSt (IDEMITSU DAPHNE SUPER GEAR 460 of Idemitsu Petro-Chemical Co., Ltd.), by the method already described hereinabove. Using the bushes, slide bearing assemblies of the design shown in FIG. 1 were constructed. Various values of pressure were applied to the sliding surfaces of those bearing assemblies and galling resistance measurements were conducted with each assembly being allowed to swing through an angle of 120 degrees. As is clear from the data shown in FIG. 3, the assembly using the bush impregnated with the lubricant oil of the lowest viscosity experienced galling at a pressure of about 5 kgf/mm$^2$; on the other hand, the assemblies using the bushes impregnated with the lubricant oils having viscosities of 360 cSt and 460 cSt according to the invention did not show the slightest sigh of galling at pressures of 10 kgf/mm$^2$ and above.

Figure 4:
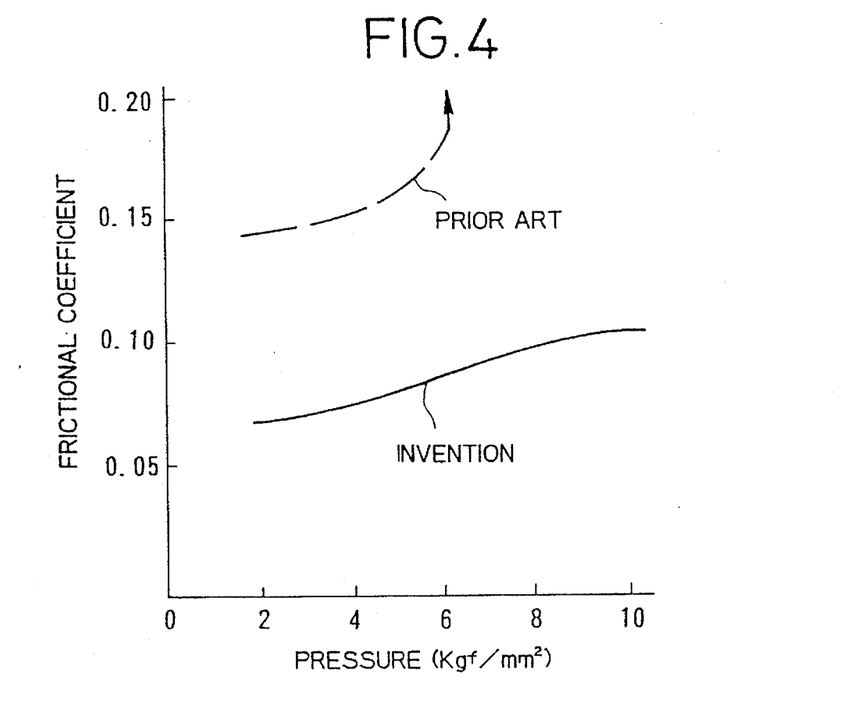
FIG. 4 is a graph comparing the tribological characteristic of a prior art grease-fed slide bearing assembly and that of the slide bearing assembly of the invention which is impregnated with a high-viscosity lubricant oil.

FIG. 4 is a diagram comparing the tribological characteristic of a prior art grease-fed slide bearing assembly and that of the slide bearing assembly of the invention which is impregnated with a high-viscosity lubricant oil. The design of the prior art grease-fed slide bearing assembly was as shown in FIG. 14. The shaft 7 was made of a steel (rf quenched S45C) and so was the bush 2. The grease was DAPHNE COLONEX EP No. 2 commercially available from Idemitsu Kosan Co., Ltd. The design of the invention slide bearing assembly impregnated with a high-viscosity lubricant oil was as shown in FIG. 1. The shaft 10 was made of a steel (rf quenched S45C) and the bush 9 was made of a carburized and quenched porous (15%) composite sintered alloy (Fe/Cu). This bush was impregnated with a lubricant oil having a viscosity of 460 cSt (IDEMITSU DAPHNE SUPER GEAR 460 of Idemitsu Petro-chemical Co., Ltd.). As is clear from the data shown in FIG. 4, the prior art grease-fed slide bearing assembly already showed a sign of galling at a pressure greater than 5 kgf/mm$^2$; on the other hand, the bearing assembly of the invention did not show the slightest sign of galling even when the pressure exceeded 10 kgf/mm$^2$.

Figure 5:
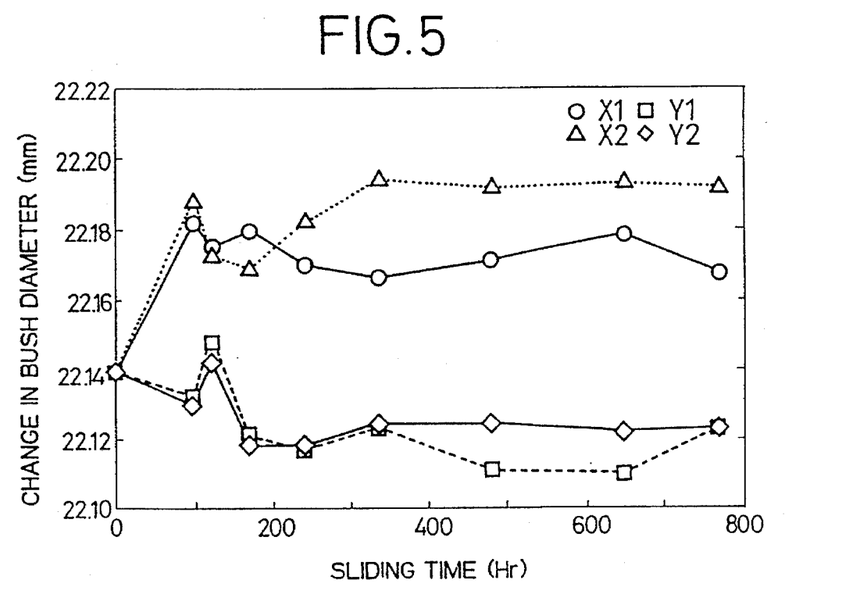
FIG. 5 is a graph showing how much the bush of the slide bearing assembly of the invention wore when it was subjected to continuous swinging motions for 800 hours.
Figure 6:
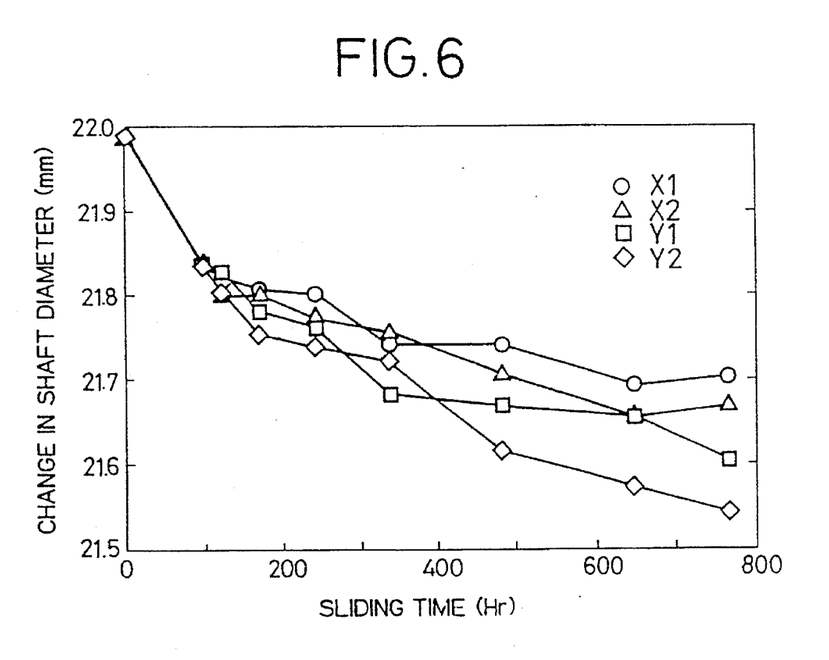
FIG. 6 is a graph showing how much the shaft of the slide bearing assembly of the invention wore when it was subjected to continuous swinging motions for 800 hours.

FIGS. 5 and 6 are characteristic diagrams showing the amounts of wear that occurred in the bush and the shaft, respectively, of the slide bearing assembly of the invention when it was subjected to continuous swinging motions for 800 hours. The bearing assembly had the basic construction shown in FIG. 1. The shaft 10 was made of a steel (rf quenched S45C) and the bush 9 was made of a carburized and quenched porous (15%) composite sintered alloy (Fe/Cu). This bush was impregnated with a lubricant oil having a viscosity of 460 cSt (IDEMITSU DAPHNE SUPER GEAR 460 of Idemitsu Petro-Chemical Co., Ltd.). The testing conditions were as follows: pressure, 8 kgf/mm$^2$; swing angle, 120 degrees; load direction, constant; peripheral speed, 12 rpm. The results of measurements are shown in FIG. 5 for four swinging directions, X1, X2, Y1 and Y2. As is clear from FIG. 5, the bush was substantially free of uneven wear even after the lapse of 800 hours and the result was independent of the swinging direction. Similarly, the shaft was substantially free of uneven wear even after the lapse of 800 hours and the result was also independent of the swinging direction (see FIG. 6). The amount of wear that occurred in the bush and the shaft was also very small and did not exceed about 0.4 mm. These results demonstrate that the slide bearing assembly which used the sintered bush impregnated with the high-viscosity lubricant oil according to the invention did not experience any galling during the continuous 800-h operation even at a pressure as high as 8 kgf/mm$^2$.

The present inventors found that when the slide bearing assembly of the invention was subjected to sliding motions for a specified time (say, about 50 hours) after assembling, there was produced a black viscous lubricating substance other than the lubricant oil impregnated in the bush. This black viscous lubricating substance is assumed to be the product of the mechanochemical reaction caused by the sliding of the shaft against the bush. The mixture of the lubricant oil impregnated in the bush and the subsequently formed black viscous lubricating substance would contribute to the realization of prolonged sliding operations without oil refillings. The term "mechanochemistry" means the changes such as those in structure, phase transfer, reactivity, adsorptivity and catalytic activity that are caused by applying mechanical energies, e.g. milling, friction, drawing and compression, to solid substances (see Iwanami's Dictionary of Physicochemistry, 4th Ed., p. 1276).

Figure 7A:
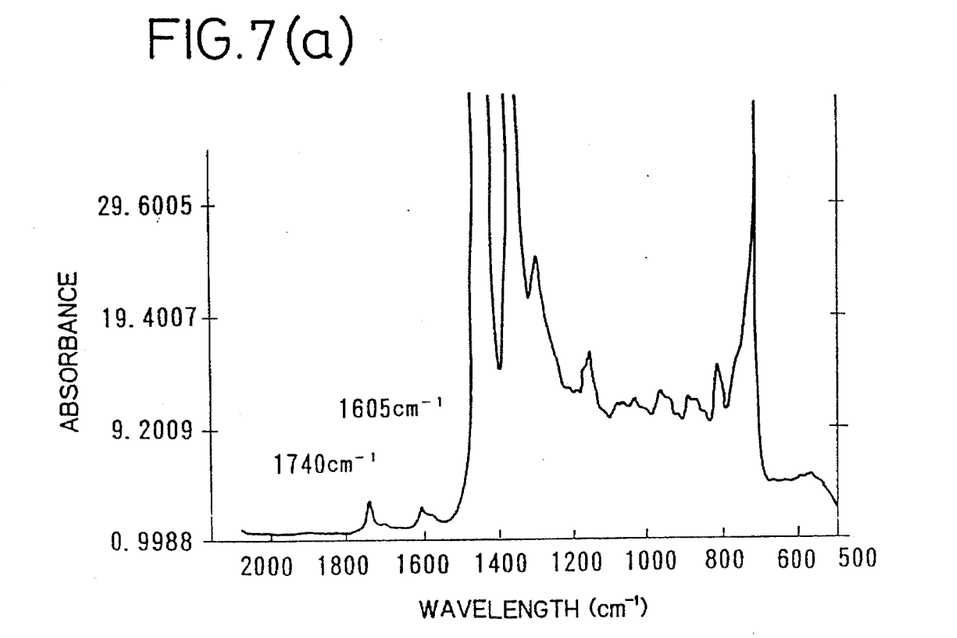
FIG. 7a is an ir spectroscopic chart for a fresh virgin lubricant oil.
Figure 7B:
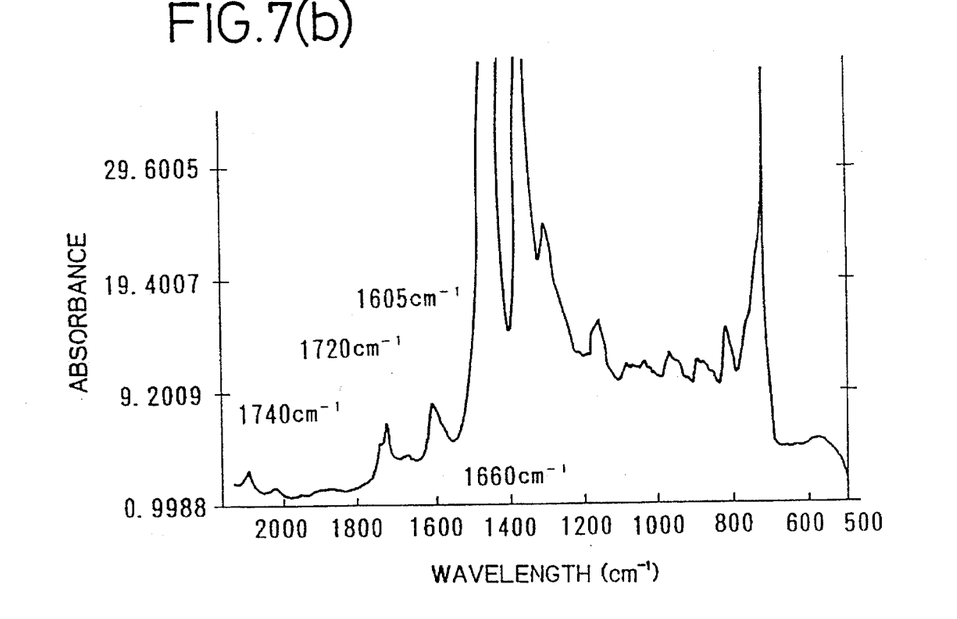
FIG. 7b is an ir spectroscopic chart for the black viscous lubricating substance that formed when the bush impregnated with said lubricant oil and the shaft were caused to slide for 100 hours.
Figure 8:
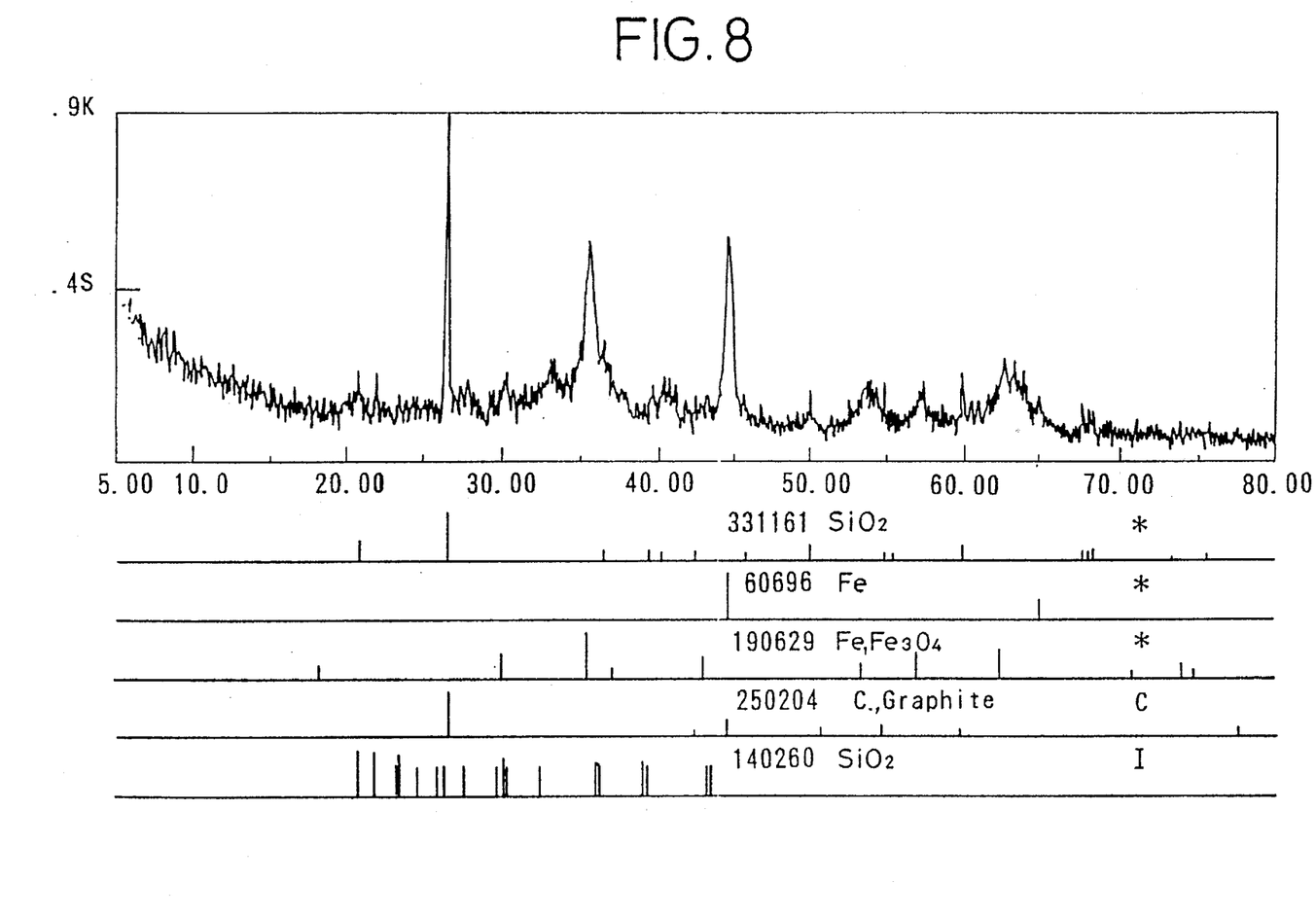
FIG. 8 is a chart constructed by X-ray identification and analysis of a dried powder of the solid matter that was separated from the oily content of the black viscous lubricating substance.

FIGS. 7 and 8 are ir spectroscopic charts showing the results of compositional analysis of the black viscous lubricating substance. FIG. 7a refers to IDEMITSU DAPHNE SUPER GEAR 460 impregnated fresh and virgin in the bush 9; and FIG. 7b refers to the black viscous lubricating substance which was produced when the bush impregnated with that lubricant oil and the shaft were allowed to slide for 100 hours. As is clear from FIG. 7b, the black viscous lubricating substance showed noticeable additional absorption bands at wavelengths of 1720 cm$^{-1}$ and 1660 cm$^{-1}$ in the ir range. The absorption at 1720 cm$^{-1}$ could be assigned to a carbonyl group (ester) and the absorption at 1660 cm$^{-1}$ to a carbon-carbon double bond (olefin). These results verified that a chemical change occurred in the lubricant oil impregnated in the bush.

FIG. 8 is a chart constructed by X-ray identification and analysis of a dried powder of the solid matter that was separated from the oily content of the black viscous lubricating substance. Obviously, the solid matter was chiefly composed of $SiO_2$, $Fe_3O_4$, C, graphite and $\alpha$-$Fe_2O_3$. Combining this result with the data shown in FIG. 7, one can verify that a mechanochemical reaction occurred in the part of sliding of the shaft 10 against the bush 9.

Figure 9A:
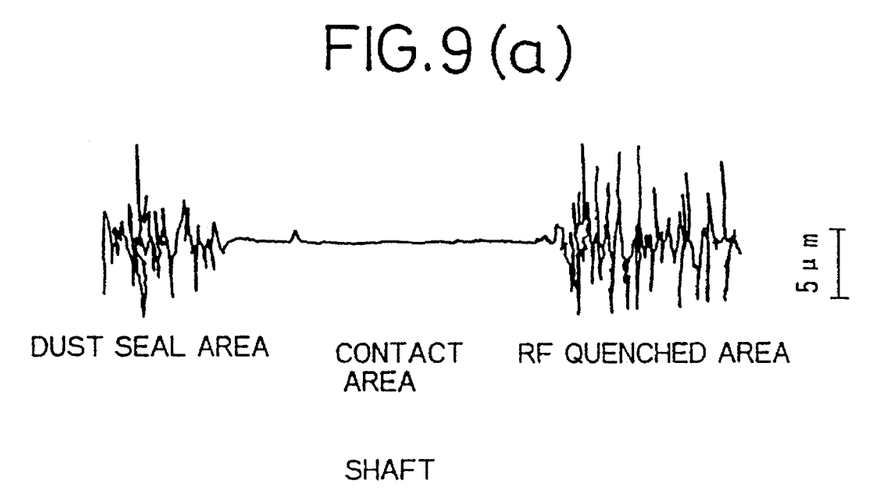
FIG. 9a is a waveform chart showing the result of measurement with a probe-type roughness meter of the sliding surface profile of shaft 10 that was disconnected from the slide bearing assembly after the formation of the black viscous lubricating substance was verified.
Figure 9B:
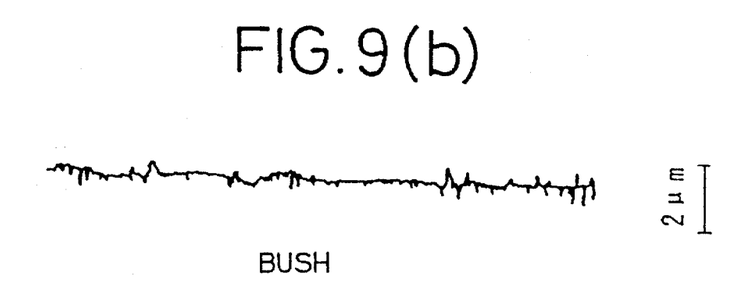
FIG. 9b is a waveform chart showing the sliding surface profile of bush 9 that was disconnected from the assembly.

FIG. 9 is a set of waveform charts showing the results of measurements with a probe-type roughness meter of the sliding surface profiles of shaft 10 and bush 9 that were disconnected from the slide bearing assembly after the formation of the black viscous lubricating substance was verified. FIG. 9a refers to the surface roughness of the shaft 10. As is clear from this figure, the sliding interface between the shaft 10 and the bush 9 was improved to a specular state with a surface roughness of 1 μm or less compared to the value 10–12 μm which was observed before driving the assembly. On the other hand, the area of contact with the shaft 10 and the dust seal 3 which would not slide against the bush, as well as the rf quenched portion of the shaft 10 remained as rough as in the initial case (before driving the assembly). FIG. 9b refers to the surface roughness of the bush 9, showing that the entire sliding surface of the bush 9 was obviously improved to a specular state with a surface roughness of 1 μm or less. "Galling" which would otherwise occur frequently between the shaft 10 and the bush 9 was totally absent.

In principle, there is no need to use grease with the slide bearing assembly of the invention. However, the lubricant oil impregnated in the bush is yet to exude over the sliding surfaces just after the start of use of the bearing assembly and, hence, "galling" may develop if high pressure is exerted on the unlubricated sliding surfaces of the shaft and the bush. To prevent the occurrence of this "initial galling", grease is preferably applied to the surfaces of either the shaft or the bush or both before they are assembled. Preferably, grease is applied to the surfaces of the shaft in an amount of 0.001–0.1 g/cm$^2$, more preferably 0.005–0.015 g/cm$^2$, most preferably 0.01 g/cm$^2$. The preassembly application of grease is effective not only in preventing the occurrence of "initial galling" but also in facilitating the subsequent assembling of the shaft and the bush. If grease is applied in an amount less than 0.001 g/cm$^2$, it is incapable of preventing the occurrence of "initial galling". If grease is applied in an amount greater than 0.1 g/cm$^2$, not only does it interfere with the assembling operation but it will be liquefied after the shaft starts to slide against the bush and may potentially leak out of the bearing assembly. If grease is applied in the optimal amount 0.01 g/cm$^2$, it will form a film about 0.1 mm thick between the shaft and the bush, proving the most effective in preventing the occurrence of "initial galling" while insuring that the bearing assembly can be constructed in a very efficient manner.

In certain machines, the slide bearing assembly is subject to the application of pressures of 8 kgf/mm$^2$ of more to local surface areas on account of "uneven touch" under eccentric loads during the driving of the assembly. With such machines, the completed bearing assembly may be driven to perform sliding motions for a period of 50–200 hours, preferably 75–150 hours, more preferably 100–130 hours, so that the shaft and the bush are "broken in" and, thereafter, grease is supplied over the sliding surfaces of the shaft and the bush in an amount of 0.001–0.1 g/cm$^2$, preferably 0.005–0.015 g/cm$^2$, more preferably 0.01 g/cm$^2$. If the time of post-completion sliding is shorter than 50 hours, the shaft and the bush will not be sufficiently "broken in" so that the combined use of grease may occasionally fail to exhibit its intended effect. If the time of post-completion sliding is longer than 200 hours, "uneven touch" is prone to occur and the chance of "galling" will increase. Hence, grease is preferably supplied before such "galling" occurs. If the time of post-completion sliding is between 100 and 130 hours, the shaft and the bush are satisfactorily "broken in" and, in addition, the presence of both the high-viscosity lubricant oil in the bush and the product of mechanochemical reaction will substantially eliminate the chance of the occurrence of "galling" due to "uneven touch". Therefore, if grease is to be supplied, it is best injected when 100–130 hours have passed since the start of post-completion sliding. If grease is injected in an amount less than 0.001 g/cm$^2$, it is incapable of preventing the occurrence of "galling" due to "uneven touch". If grease is injected in an amount greater than 0.01 g/cm$^2$, part of the liquefied grease may sometimes leak out of the bearing assembly. If grease is injected in the optimal amount 0.01 g/cm$^2$, the liquefied grease will stay over the sliding surfaces of the shaft and the bush with minimum chance of leakage out of the bearing assembly and yet most satisfactory prevention of "galling" is accomplished.

Figure 10:
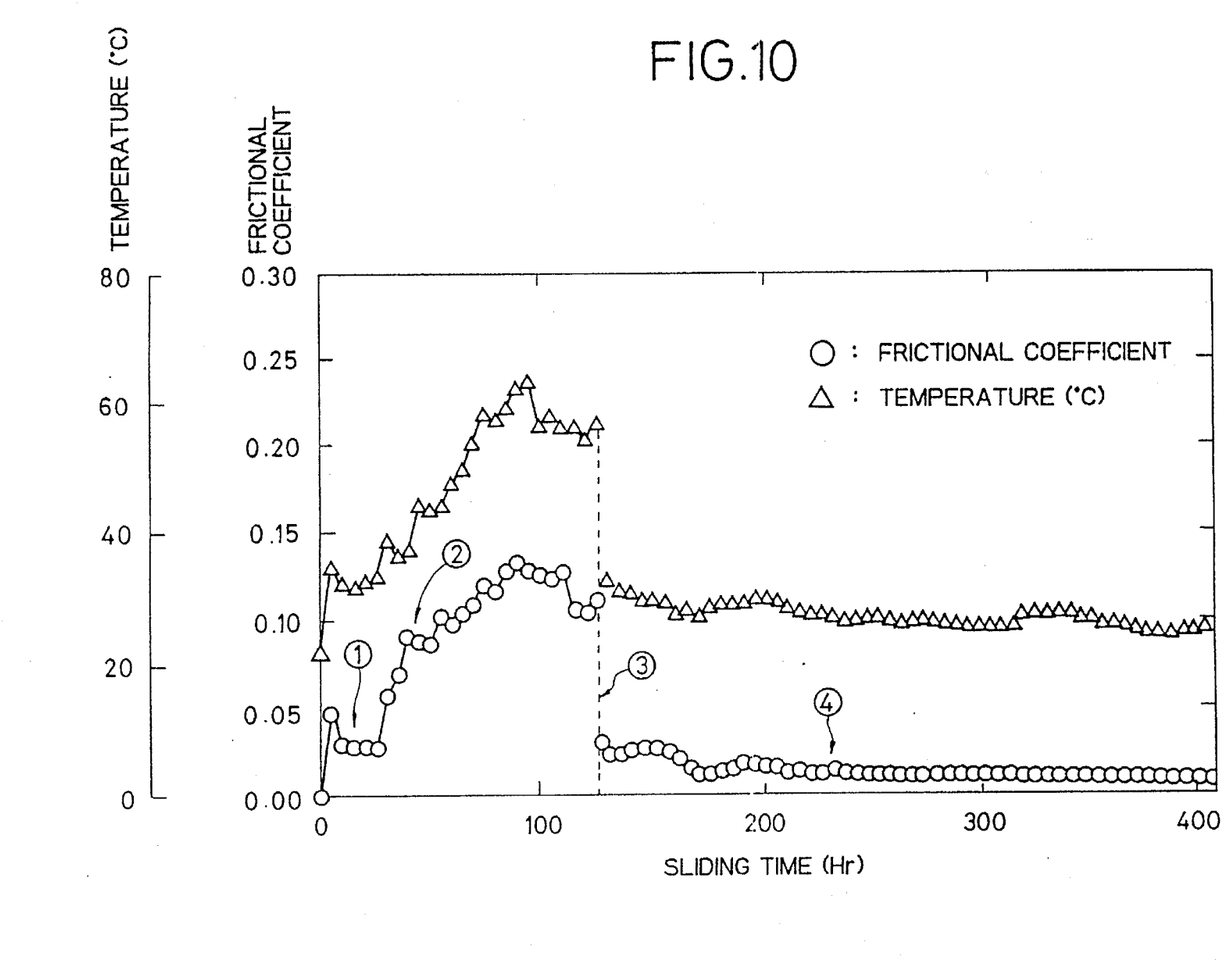
FIG. 10 is a graph showing characteristic curves for the relationship among frictional coefficient, temperature and sliding time that demonstrate the effect of the combined use of a high-viscosity lubricant oil and grease in the slide bearing assembly of the invention.

FIG. 10 is a characteristic diagram showing the relationship among frictional coefficient, temperature and sliding time that demonstrates the effect of injecting grease after the post-completion sliding of the bearing assembly. The data shown in FIG. 10 were attained with a bench test apparatus simulating an actual machine and that was operated under the following conditions; pressure, 8 kgf/mm$^2$; swing angle, 120°; load direction, constant; peripheral speed, 12 rpm. For temperature measurements, a thermocouple (alumel/chromel wires) was spot welded to the porous bush and the frictional heat developing between the shaft and the porous bush was measured in terms of the thermoelectromotive force. For frictional coefficient measurements, the torque developing between the porous bush and the shaft was measured with a non-contacting torque meter (Kyowa Electronic Instruments Co., Ltd.) and the corresponding frictional coefficient was determined by the equation $\mu = T/N \cdot r$, where $\mu$ is the frictional coefficient, T is the torque produced, N is the vertically applied load, and r is the radius of the shaft. Referring to the frictional coefficient curve in FIG. 10, portion (1) corresponds to the effect achieved by the grease as applied in an amount of 0.01 g/cm$^2$ prior to assembling and, obviously, the frictional coefficient dropped to 0.03; portion (2) corresponds to the state where the post-completion sliding caused most of the preliminarily applied grease to be exhausted from the sliding surfaces of the shaft and the bush (i.e., the initial state of the process in which the shaft and the bush were "broken in") and, obviously, the frictional coefficient rose to a value between 0.10 and 0.13; dashed line (3) shows that the frictional coefficient dropped sharply down to 0.03 as soon as grease was supplied in an amount of 0.01 g/cm$^2$ over the sliding surfaces of the shaft and the bush when 125 hours passed after the start of the post-completion sliding; and portion (4) is a stable range over which the frictional coefficient was maintained at values of no more than 0.02. Such low values of frictional coefficient were maintained invariably even after the passage of 1000 hours. One can also understand from FIG. 10 that the temperature profile was identical to the above-discussed profile of frictional coefficient. Grease will deteriorate with increasing temperature but as can be seen from FIG. 10, temperature is maintained at a substantially constant level in the slide bearing assembly of the invention and, hence, the deterioration of grease is negligible. This enables the extension of grease injection intervals to 1000 hours or longer. It should, however, be noted that this advantageous effect of injecting grease after the post-completion sliding is synergism with the impregnation of the high-viscosity lubricant oil in the bush and in the absence of the high-viscosity lubricant oil from the bush, grease must be refilled at 100-h intervals.

The slide bearing assembly of the invention is, in principle, to be used without refilling of lubricant oils or grease but, as mentioned a few paragraphs ago, certain machines justify the feeding of grease in combination with the high-viscosity lubricant oil. In this case, the bearing assembly 10 shown in FIG. 1 may be provided with a grease feed hole as indicated by 32 in FIG. 14 which shows a prior art slide bearing assembly.

Figure 11:
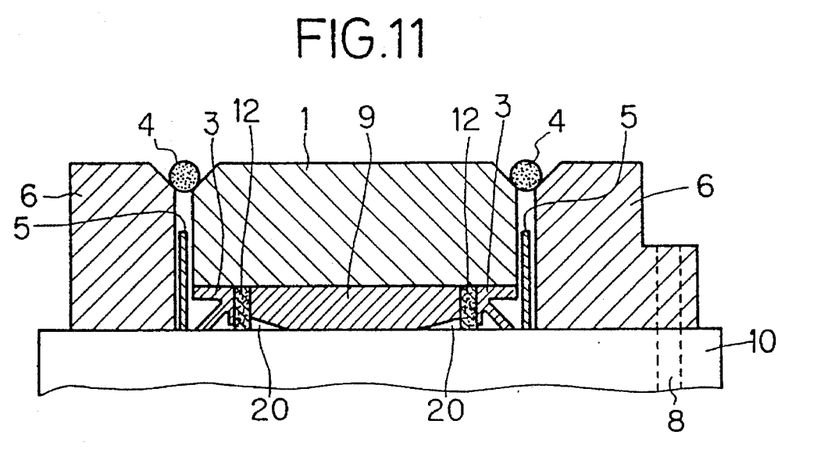
FIG. 11 is a cross-sectional view showing schematically part of another example of the slide bearing assembly of the invention.

FIG. 11 is a partial cross-sectional view showing another example of the slide bearding assembly of the invention. As shown, the bush 9 is provided with a crown 20 at both ends and this is for assuring higher reliability in strength in anticipation of uneven touch between the shaft 10 and the bush 9 which will typically occur on account of their clearance or deformation of the shaft.

Figure 12:
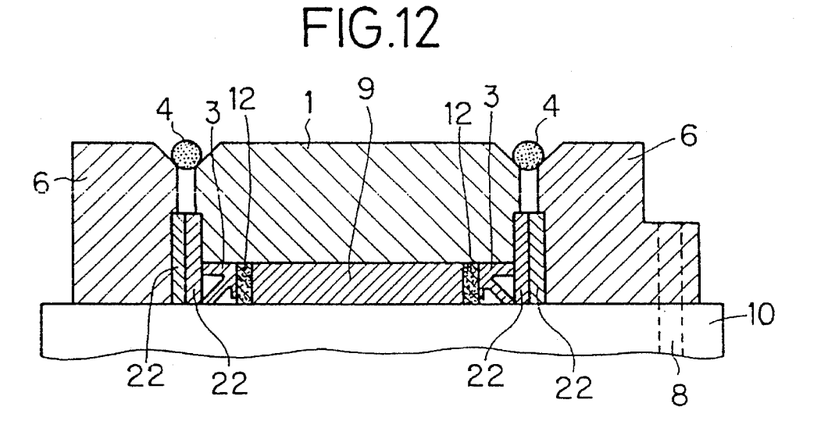
FIG. 12 is a cross-sectional view showing schematically part of yet another example of the slide bearing assembly of the invention.

FIG. 12 is a partial cross-sectional view showing yet another example of the slide bearing assembly of the invention. If soil, sand, etc. enter the bearing assembly via the O-rings 4 [an example of such intrusion is $SiO_2$ having a Vickers hardness (Hv) of about 1000], they will exhibit their wearing action to cause wear and other damage to the boss 1 and the brackets 6. In order to avoid this problem, the assembly shown in FIG. 12 is equipped with wear-resisting plates 22 that have a hardness comparable to or higher than that of the soil, sand, etc. These wear-resisting plates 22 are effective not only in improving the tribological characteristics of the bearing assembly and the strength of the bearing per se but also in preventing the occurrence of rattling.

Figure 13:
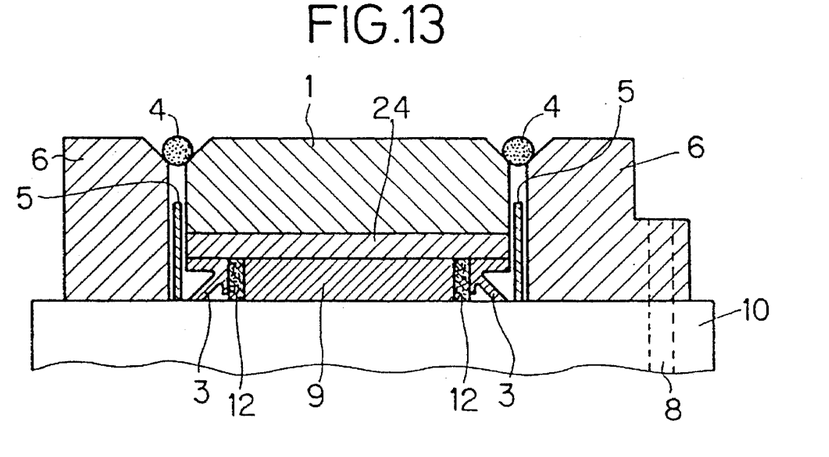
FIG. 13 is a cross-sectional view showing schematically part of still another example of the slide bearing assembly of the invention.

FIG. 13 is a partial cross-sectional view showing a further example of the slide bearing assembly of the invention. As shown, a high-strength bush 24 made of an iron or a steel (e.g. S45C quenched steel) is interposed between the bush 9 (made of a porous composite sintered alloy) and the boss 1 with a view to compensating for the insufficiency of strength in both end portions of the bush 9. The additional bush 24 enables the slide bearing assembly of the invention to be used with the application of even higher pressures to the sliding surfaces of the assembly.

The slide bearing assembly of the invention is particularly suitable for use under such conditions that the pressure applied to the sliding surfaces is at least 6 kgf/mm$^2$ whereas the PV value is at least 1.0 kgf·m/mm$^2$·s. Stated more specifically, the slide bearing assembly of the invention is particularly adapted for use in slow- and high-pressure applications as exemplified by a bearing in the front part of an excavator, a bearing in the arm of a crane, a bearing in a roller gate on the sluice of a dam, a bearing in a vertically slidable cam on a press mold, a bearing for water wheel guide vanes in hydroelectric power generation and a bearing for an unloader pin on a marine crane.

Porous oil-filled bearings per se are known to be capable of use without oil refillings and they include, for example, oil-filled bearings made from cast copper alloys and those made from sintered powders. The conventional porous oil-filled bearings use lubricant oils of comparatively low viscosities and, under the application of high pressures to the sliding surfaces of the shaft and the bush, the viscosity of the lubricant oil will decrease further on account of the frictional heat from the sliding of the shaft against the bush. This fact, combined with the sliding motions of the shaft against the bush, will cause a substantial amount of the lubricant oil to be exhausted from both the bush and the sliding surfaces in the early stage of operation. With the resulting great loss of the lubricant oil, the interval between oil refillings may be increased to some extent but it certainly is impossible to drive the bearing for a prolonged period of at least several years without any oil refillings. Further, the conventional porous oil-filled bearings have been operated with PV values less than 1 kgf·m/mm$^2$·s; however, with the recent models of excavators which feature higher efficiencies and greater output powers, it is strongly desired that their front parts be operated with PV values of 1 kgf·m/mm$^2$·s and more while exhibiting frictional coefficiencies ($\mu$) of no more than 0.15. However, none of the conventional porous bearings which are impregnated with low-viscosity lubricant oils are capable of providing slide bearing assemblies that satisfy these requirements and which yet can be used for a prolonged period without any oil refillings.

In contrast, the present invention offers a slide bearing assembly that is suitable for use in high-pressure ($\leq 6$ kgf/mm$^2$) environments and which yet can be subjected to sliding motions for a prolonged period of at least several, say, five years without any oil refillings.

What is claimed is:

1. In a slide bearing assembly comprising at least a shaft and a bush that is formed of a porous iron-base sintered material, the improvement wherein said bush is impregnated with a lubricant oil having a viscosity in the range from 240 to 1500 cSt.

2. A slide bearing assembly according to claim 1 wherein said shaft is made of an iron or a steel that have been carburized, rf quenched and nitrided, followed by the formation of a conversion coating or sulfurizing to modify the surface thereof.

3. A slide bearing assembly according to claim 1 wherein said bush is made of a composite sintered alloy of an iron and a copper powder having a porosity of 5–30%, wherein the pores in said bush communicate with one another, and wherein said bush has its surface modified by carburization, nitriding or sulfonitriding.

4. A slide bearing assembly according to claim 1 which is to be used with a pressure of at least 6 kgf/mm$^2$ being applied to the sliding surfaces.

5. A slide bering assembly according to claim 4 which is to be used with a pressure of at least 6 kgf/mm² being applied to the sliding surfaces and at a sliding speed of 2–5 cm/sec.

6. A slide bearing assembly according to claim 1 wherein said lubricant oil contains the particles of at least one solid lubricant selected from among $MoS_2$, $WS_2$, hexagonal BN and graphite, said particles having sizes of no more than 500 µm.

7. A slide bearing assembly according to claim 1 wherein an oil shield member is provided in contact with either end of said bush.

8. A slide bearing assembly according to claim 7 wherein said oil shield member is formed of a soft, elastic and oil-absorbing material.

9. A slide bearing assembly according to claim 8 wherein said oil shield member is formed of a nonwoven fabric, a woven fabric, a porous elastic plastic material, sponge, asbestos or a felt.

10. A slide bearing assembly according to claim 1 wherein said bush is provided with crown portions.

11. A slide bearing assembly according to claim 1 which has a bracket positioned at either end of a boss having the bush provided in contact with the inner periphery thereof and wherein a very hard wear-resistant plate is provided between the sliding surfaces of said boss and each of said brackets.

12. A slide bearing assembly according to claim 1 which has a boss and two concentric bushes within said boss, one of which is a high-strength bush that is provided radially outward and positioned in contact with the inner periphery of said boss while the other is a porous composite sintered alloy bush that is provided radially inward of said high-strength bush.

13. A slide bearing assembly according to claim 1 which has the product of mechanochemical reaction at the sliding surfaces of said shaft and said bush, said reaction product having been formed as a result of sliding of said shaft against said bush.

14. A slide bearing assembly according to claim 1 which is to be used with a pressure of at least 8 kgf/mm² being applied to the sliding surfaces, wherein either the shaft or the bush is coated with grease in an amount of 0.001–0.1 g/cm², the shaft is then inserted into the bush for assembling, followed by sliding the shaft against the bush for a period of 50–200 hours and wherein grease is subsequently supplied over the sliding surfaces of the shaft and the bush in an amount of 0.001–0.01 g/cm².

15. A slide bearing assembly according to claim 14 which is to be used with a pressure of at least 8 kgf/mm² being applied to the sliding surfaces, wherein either the shaft or the bush is coated with grease in an amount of 0.005–0.015 g/cm², the shaft is then inserted into the bush for assembling, followed by sliding the shaft against the bush for a period of 75–150 hours and wherein grease is subsequently supplied over the sliding surfaces of the shaft and the bush in an amount of 0.005–0.015 g/cm².

16. A slide bearing assembly according to claim 15 which is to be used with a pressure of at least 8 kgf/mm² being applied to the sliding surfaces, wherein either the shaft or the bush is coated with grease in an amount of 0.01 g/cm², the shaft is then inserted into the bush for assembling, followed by sliding the shaft against the bush for a period of 100–130 hours and wherein grease is subsequently supplied over the sliding surfaces of the shaft and the bush in an amount of 0.01 g/cm².

17. A slide assembly according to claim 1 which is to be used as a bearing assembly in the front part of an excavator.

18. A slide bearing assembly according to claim 1 which is to be used as a bearing assembly in the arm of a crane.

19. A slide bearing assembly according to claim 1 which is to be used as a bearing assembly in a roller gate on the sluice of a dam.

20. A slide bearing assembly according to claim 1 which is to be used as a bearing assembly in a vertically slidable cam on a press mold.

21. A slide bearing assembly according to claim 1 which is to be used as a bearing assembly for water wheel guide vanes in hydroelectric power generation.

22. A slide bearing assembly according to claim 1 which is to be used as a bearing assembly for an unloader pin on a marine crane.

\* \* \* \* \*